(12) United States Patent
Ito et al.

(10) Patent No.: US 9,044,899 B2
(45) Date of Patent: Jun. 2, 2015

(54) POROUS FILM PRODUCTION METHOD

(75) Inventors: Koju Ito, Kanagawa (JP); Hidekazu Yamazaki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 927 days.

(21) Appl. No.: 12/846,073

(22) Filed: Jul. 29, 2010

(65) Prior Publication Data

US 2011/0024935 A1 Feb. 3, 2011

(30) Foreign Application Priority Data

Jul. 30, 2009 (JP) .................................. 2009-177535

(51) Int. Cl.
*B29D 7/00* (2006.01)
*B29C 67/20* (2006.01)

(52) U.S. Cl.
CPC .................................... *B29C 67/202* (2013.01)

(58) Field of Classification Search
CPC ................. B29K 2105/041; C08J 2201/0504; C08J 5/18; A61L 27/56; Y10S 264/62
USPC ........ 264/212, 45.1, 48, 50, 51, 53, 628, 629, 264/651, 241, 299, 413, 41, 45.6, 45.8
See application file for complete search history.

(56) References Cited

U.S. PATENT DOCUMENTS 5,158,636 A * 10/1992 Groitzsch et al. ............. 156/230
7,931,848 B2 4/2011 Ochi et al.
2003/0129381 A1* 7/2003 Mori ........................... 428/315.5
2006/0097361 A1* 5/2006 Tanaka et al. .................. 257/643
2008/0182024 A1* 7/2008 Ochi et al. ..................... 427/331

FOREIGN PATENT DOCUMENTS

| JP | 2000-044709 | * 2/2000 |
| JP | 2001-157574 | 6/2001 |
| JP | 2005-152526 | 6/2005 |
| JP | 2007291367 | * 8/2007 |
| JP | 2007-291367 | 11/2007 |
| JP | 2008-179749 | 8/2008 |
| WO | WO 2009/041376 | 4/2009 |

OTHER PUBLICATIONS

Japanese Office Action dated Jan. 15, 2014 in corresponding Japanese Patent Application No. 2009-177535 with English translation of Japanese Office Action.

* cited by examiner

*Primary Examiner* — Stella Yi
(74) *Attorney, Agent, or Firm* — Young & Thompson

(57) ABSTRACT

A solution of polymer uniformly dissolved into a solvent is prepared in a solution preparing step. The solvent contains good and poor solvent components for the polymer. The solution is discharged from a coating die to a support to be a coating film thereon in a primary body forming step. A water drop generating step and a fluidity decreasing step are performed in parallel with each other while wet air is applied to the coating film. Water drops are generated on a surface of the coating film in the water drop generating step. The good solvent component is evaporated from the coating film to decrease fluidity of the solution for forming the coating film in the fluidity decreasing step. In the water drop evaporating step, dry air is applied to the coating film. The solvent and the water drops are evaporated from the coating film to obtain the porous film.

4 Claims, 5 Drawing Sheets

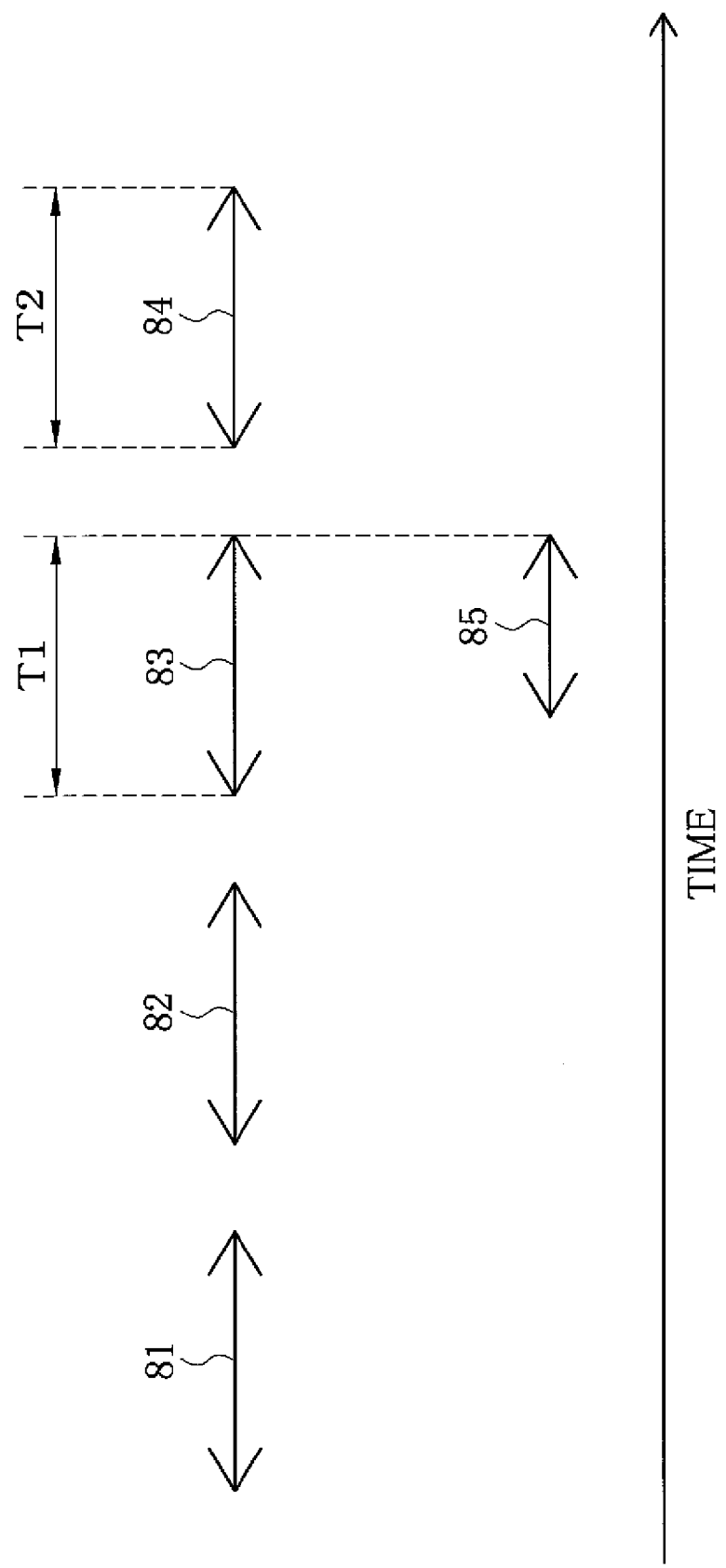

POROUS FILM PRODUCTION METHOD

FIELD OF THE INVENTION

The present invention relates to a porous film production method.

BACKGROUND OF THE INVENTION

In recent years, increase in integration degree, higher information density, and higher image definition have been desired more and more in fields of optics and electronics. Therefore, a film used in these fields is strongly required to have a finer structure on its surface. Namely, forming a fine pattern structure (hereinafter referred to as fine patterning) has been strongly required. Additionally, in a field of research for a regenerative medicine, a film having a fine structure on its surface is effectively used as a scaffold for cell culture.

Various methods for the fine pattering have been put to practical use. For example, there are a deposition method using a mask, an optical lithography adopting photochemical reaction and polymerization reaction, a laser ablation technique, and the like.

Additionally, as the fine patterning, there is known a method for forming a porous film having a plurality of pores by blowing wet air toward a coating film which is formed from a polymer solution, as disclosed in Japanese Patent Laid-Open Publication No. 2001-157574 or No. 2007-291367, for example. The method for forming a porous film is described roughly hereinbelow. At first, a solution containing a hydrophobic polymer and a hydrophobic solvent, as materials of the porous film, is applied to a support to form a coating film on the support. Then, wet air is blown toward an exposed surface of the coating film, such that water vapor is condensed from ambient air on the exposed surface to generate water drops thereon. The generated water drops are arranged regularly with the support of capillary force and the like. Wet air is further blown toward the exposed surface such that the generated water drops are grown up. After the water drops are grown up to have a desired size, the blowing of the wet air is stopped. Thereafter, a predetermined gas is supplied to the coating film to evaporate the solvent from the coating film. Thereby, fluidity of the solution for forming the coating film is decreased, and as a result, it is possible to obtain a primary body having film form, which has a plurality of pores. Note that, the pores are made by using the water drops as a template of a porous structure. Finally, dry air is blown toward the primary body to evaporate the water drops and the solvent remained in the primary body. Accordingly, the porous film can be obtained.

It is known that the size and formation density of the pores in the porous film obtained by the above method are influenced by the formation amount of cores of the water drops and the growth degree of cores of the water drops during the production process. Additionally, it is known that it is possible to control the formation amount of cores of the water drops and the growth degree of cores of the water drops by arbitrarily adjusting a parameter $\Delta Tw$. The parameter $\Delta Tw$ is obtained by subtracting a temperature TS of the exposed surface of the coating film from a dew point TD of air around the exposed surface of the coating film. Therefore, when the water drops are generated or grown up on the exposed surface under the arbitrarily adjusted parameter $\Delta Tw$, it is possible to achieve desired size and formation density of the pores in the porous film as a final product.

In such a method for forming the porous film, the viscosity of the solution for forming the coating film is preferably as low as possible, such that the water drops can be generated, grown up, and arranged regularly on the coating film. In view of the above, it is required to use a solution in which the content of the solvent is extremely larger than that of the hydrophobic polymer in the method for forming the porous film.

In a case where the solution in which the content of the solvent is extremely large is used to produce the porous film as described above, an immense amount of time is required to evaporate most solvent contained in the coating film. Therefore, it has been difficult to improve productivity of the porous film.

SUMMARY OF THE INVENTION

In view of the above, an object of the present invention is to provide a porous film production method capable of producing a porous film efficiently.

In order to achieve the above and other objects, a production method of porous film having a plurality of pores according to the present invention includes a primary body forming step, a water drop generating step, a fluidity decreasing step, and a water drop evaporating step. In the primary body forming step, a primary body having film form is formed from a solution containing a hydrophobic polymer and a solvent on a support. In the water drop generating step, water vapor is condensed from ambient air on the primary body to generate water drops on the primary body. In the fluidity decreasing step, the solvent is evaporated from the primary body such that fluidity of the solution for forming the primary body is decreased. In the water drop evaporating step, the water drops are evaporated from the primary body subjected to the fluidity decreasing step. The solvent includes a good solvent component for the hydrophobic polymer and a poor solvent component for the hydrophobic polymer. The evaporation of the solvent is performed in parallel with the water drop generating step. The good solvent component is evaporated in the evaporation of the solvent. The pores are made by the water drops as a template for a porous structure.

The poor solvent component preferably has hydrophobic character. An evaporation speed of the good solvent component is preferably made faster than an evaporation speed of the poor solvent component.

Further, it is preferable that a value of $\Delta Tsr$ obtained by subtracting TA from TRr is made smaller than a value of $\Delta Tsh$ obtained by subtracting TA from TRh in the fluidity decreasing step, in which the TRr is a condensation point of vapor of the good solvent component, the TA is an atmospheric temperature around the primary body, and the TRh is a condensation point of vapor of the poor solvent component.

Furthermore, preferably, timing for completing the evaporation of the good solvent component is made earlier than timing for completing the evaporation of the poor solvent component.

According to the present invention, since the solvent containing the good solvent component for the hydrophobic polymer and the poor solvent component for the hydrophobic polymer is used, it is possible to decrease the time required from the start of the water drop generating step to the end of the water drop evaporating step, in comparison with conventional methods. Therefore, according to the present invention, it is possible to produce the porous film efficiently.

DESCRIPTION OF THE DRAWINGS

One with ordinary skill in the art would easily understand the above-described objects and advantages of the present invention when the following detailed description is read with reference to the drawings attached hereto:

FIG. 3 is an explanatory view schematically illustrating a porous film production method of a first embodiment;

FIGS. 4A to 4C are explanatory views schematically illustrating a coating film in the porous film production apparatus, wherein FIG. 4A is an explanatory view schematically illustrating the coating film in a first section, FIG. 4B is an explanatory view schematically illustrating the coating film in a second section, and FIG. 4C is an explanatory view schematically illustrating the coating film in a third section;

DESCRIPTION OF THE PREFERRED EMBODIMENTS

Hereinafter, preferred embodiments of the present invention are described in detail. However, the present invention is not limited thereto.

Figure 1A:
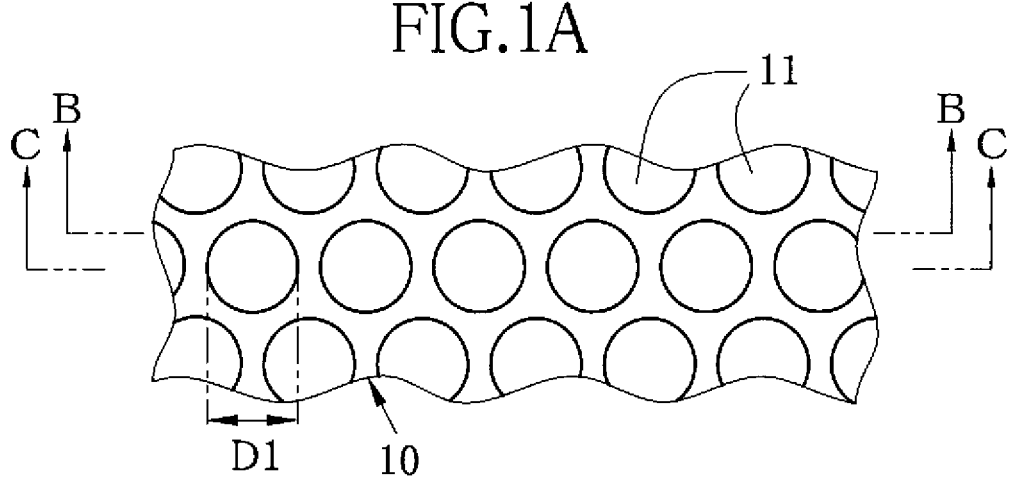
FIG. 1A is a plan view schematically illustrating a porous film having a plurality of through pores.
Figure 1B:
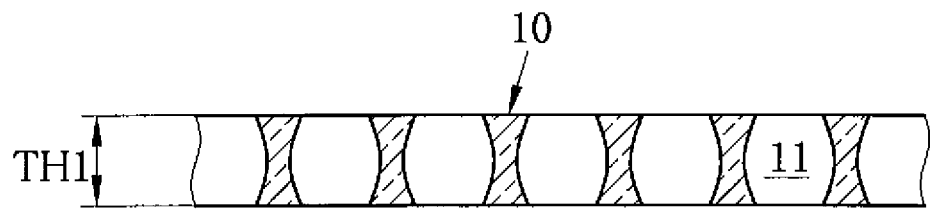
FIG. 1B is a cross sectional view taken along chain double-dashed lines B-B of FIG. 1A.
Figure 1C:
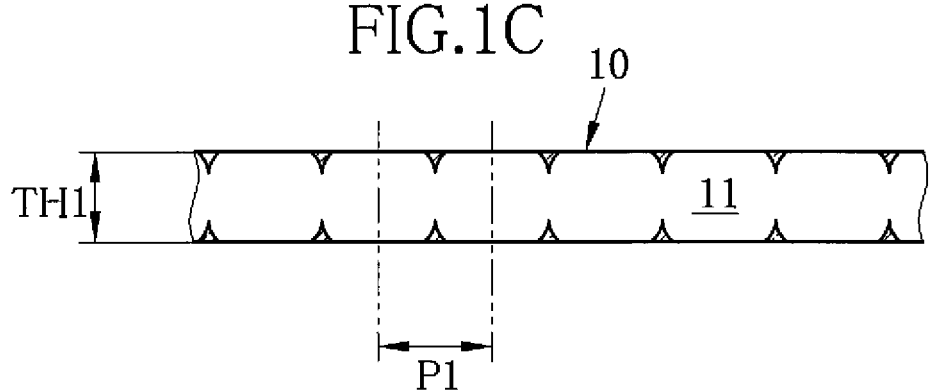
FIG. 1C is a cross sectional view taken along chain double-dashed lines C-C of FIG. 1A.
Figure 1D:
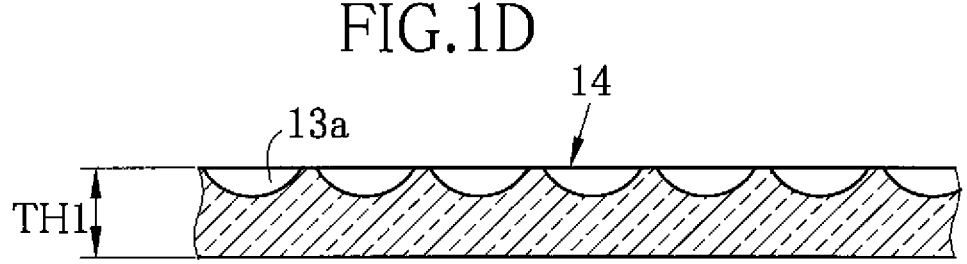
FIG. 1D is a plan view of a porous film having a plurality of dimples.

As shown in FIG. 1A, pores 11 are formed on a surface of a porous film 10 of the present invention. The pores 11 are densely arranged on the surface of the porous film 10 so as to form a so-called honeycomb structure. As shown in FIGS. 1B and 1C, the pores 11 are formed so as to penetrate both surfaces of the porous film 10. In FIG. 1B, the adjacent pores 11 are not interconnected with each other in the porous film 10. In FIG. 1C, the adjacent pores 11 are interconnected with each other in the porous film 10. Note that, instead of the pores 11, dimples 13 may be formed on one surface of a porous film 14 as shown in FIG. 1D. The porous film 14 is also applicable as the porous film of the present invention.

Note that, in this specification, the honeycomb structure means a structure in which the pores each having a specific shape and size are arranged regularly in a specific direction as described above. The regular arrangement of the pores is two dimensional in a case where the porous film is a single-layer film, and three dimensional in a case where the porous film is a multi-layer film. In the two dimensional arrangement of the pores, one pore is surrounded by plural (for example, 6) pores. In the three dimensional arrangement of the pores, the pores are formed most densely in a face-centered cubic structure or a hexagonal structure of a crystal structure in many cases. However, in some production conditions, the other arrangements are made. Note that, the number of pores formed around one pore on the same plane is not limited to six, and may be three to five, or seven or more.

Although the shape and size of the porous film 10 of the present invention is not especially limited, a thickness TH1 of the porous film 10 is preferably in the range between 0.05 μm or more and 100 μm or less, more preferably in the range between 0.1 μm or more and 50 μm or less, and most preferably in the range between 0.2 μm or more and 30 μm or less, for example, in the present invention. The size and pitch of the pores 11 vary depending on production conditions described later, and are not especially limited. For example, a diameter D1 of each of the pores 11 is preferably in the range between 0.05 μm or more and 100 μm or less, more preferably in the range between 0.1 μm or more and 50 μm or less, and most preferably in the range between 0.2 μm or more and 30 μm or less. A pitch P1 that is a distance between centers of the adjacent pores 11 is preferably in the range between 0.1 μm or more and 120 μm or less, more preferably in the range between 0.1 μm or more and 60 μm or less, and most preferably in the range between 0.2 μm or more and 40 μm or less.

(Porous Film Production Apparatus)

Figure 2:
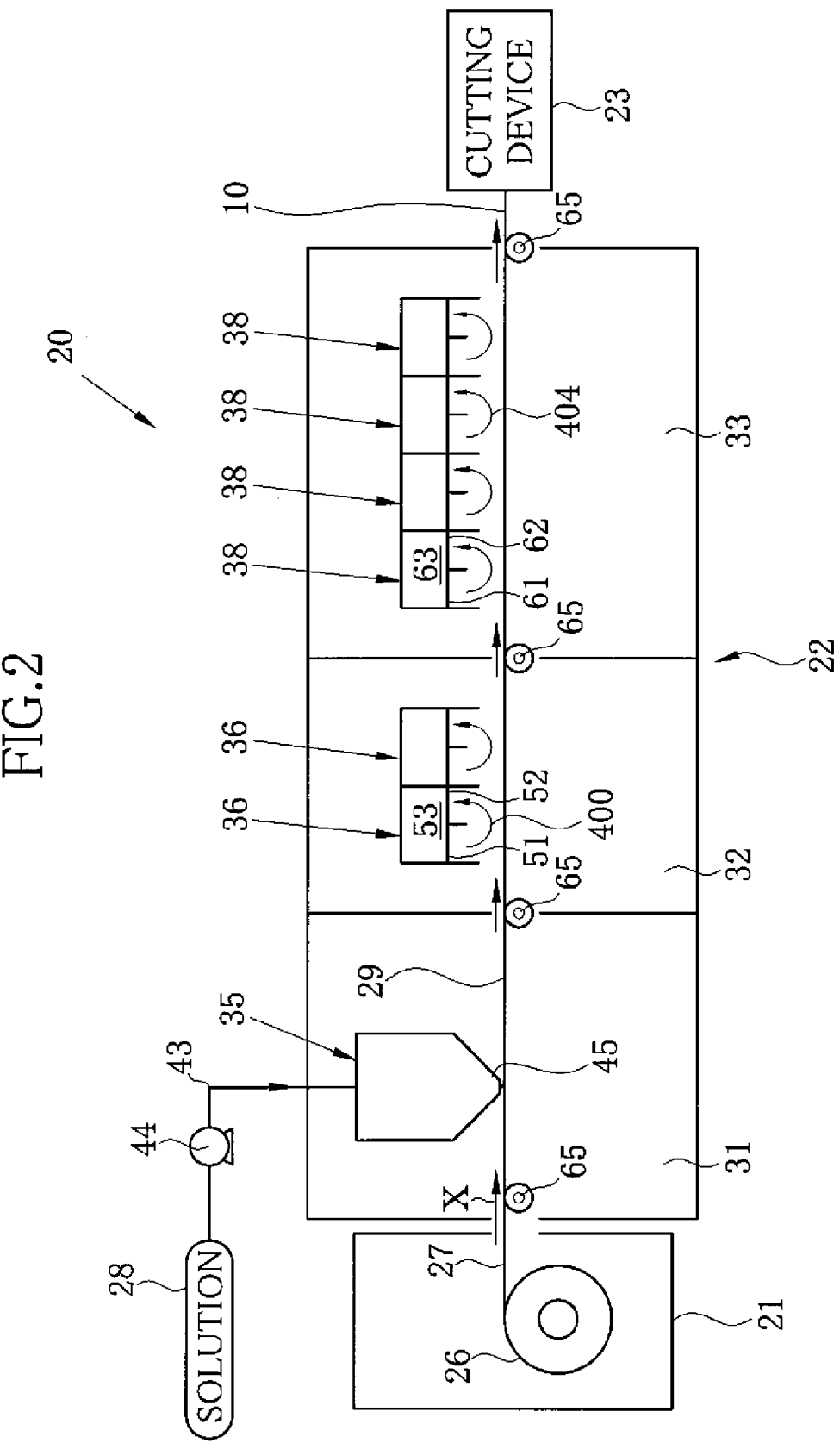
FIG. 2 is an explanatory view schematically illustrating a porous film production apparatus.

As shown in FIG. 2, a porous film production apparatus 20 includes a support feeding device 21, a coating chamber 22, and a cutting device 23. The support feeding device 21 unwinds a support roll 26 to feed a support 27 in the form of belt to the coating chamber 22. In the coating chamber 22, a solution 28 is applied to the support 27 to form a coating film 29 thereon, and the coating film 29 is subjected to given treatment to be the porous film 10. Then, the porous film 10 is fed together with the support 27 from the coating chamber 22 to the cutting device 23. In the cutting device 23, the porous film 10 is cut together with the support 27 to have a predetermined size such that an intermediate product is obtained. The intermediate product is subjected to various kinds of processing to be a final product. The support 27 may be a stainless plate, a glass plate, or a polymer plate. Note that, the support feeding device 21 and the cutting device 23 are used in order to continuously produce a large amount of porous films 10. Therefore, the support feeding device 21 and the cutting device 23 may be arbitrarily omitted depending on the production scale.

The solution 28 contains a solvent and a hydrophobic polymer which is capable of being dissolved into the solvent. As necessary, an additive may be added to the solution 28. The solvent contains a good solvent component and a poor solvent component for the hydrophobic polymer. The hydrophobic polymer, the good solvent component, and poor solvent component will be described in detail later.

(Coating Chamber)

The coating chamber 22 is divided into 3 sections which are a first section 31, a second section 32, and a third section 33 in this order from an upstream side in a moving direction of the support 27. Hereinafter, the moving direction of the support 27 is referred to as X direction. The first section 31 is provided with a coating die 35. The second section 32 is provided with air feeding/sucking units 36. The third section 33 is provided with air feeding/sucking units 38.

The coating die 35 has a slot through which the solution 28 is discharged. The slot is communicated with a tank (not shown) for storing the solution 28 through a pipe 43. The pipe 43 is provided with a pump 44. The slot through which the solution 28 is discharged is disposed in the coating die 35 so as to face the support 27. Note that, a temperature adjuster may be provided so as to adjust the temperature of each part of the coating die 35. Owing to the temperature adjuster, it is possible to adjust the temperature of the solution 28 which is discharged through the slot within a predetermined range and prevent condensation on the coating die 35, in particular, on a lip end 45 of the coating die 35.

In the second section 32, two air feeding/sucking units 36 are arranged in series along the X direction. Each of the air feeding/sucking units 36 includes a duct having an outlet 51 and an inlet 52, and an air feeder 53. The air feeder 53 adjusts a temperature and a dew point TD of wet air 400, a condensation point of the solvent vapor contained in the wet air 400, and the flow volume of the wet air 400. Further, each of the air feeding/sucking units 36 feeds the wet air 400 through the outlet 51 and sucks gas around the coating film 29 through the inlet 52. Note that, the number of the air feeding/sucking units 36 provided in the second section 32 may be one, or three or more. Here, the condensation point of the solvent vapor means the temperature at which condensation of the solvent vapor starts upon cooling of the air or gas containing the solvent vapor.

In the third section 33, four air feeding/sucking units 38 are arranged in series along the X direction. Each of the air feeding/sucking units 38 includes a duct having an outlet 61 and an inlet 62, and an air feeder 63. The air feeder 63 adjusts a temperature and a dew point of dry air 404, a condensation point of the solvent vapor contained in the dry air 404, and the flow volume of the dry air 404. Further, each of the air feeding/sucking units 38 feeds the dry air 404 through the outlet 61 and sucks gas around the coating film 29 through the inlet 62. Note that, the number of the air feeding/sucking units 38 provided in the third section 33 may be one, two, three, or five or more.

Figure 4A:
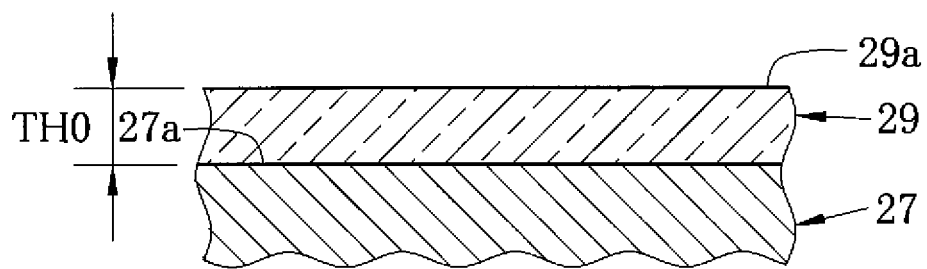

A plurality of rollers 65 are disposed arbitrarily in each of the sections 31 to 33. Main rollers 65 are shown in the drawing, and other rollers 65 are not shown. The rollers 65 include driving rollers and driven rollers, namely, free rollers. As the driving rollers are arbitrarily disposed, the support 27 is transported at a constant speed in each of the sections 31 to 33. The temperature of each of the rollers 65 is controlled by a temperature controller (not shown) in each of the sections 31 to 33. Additionally, a temperature controlling plate (not shown) is disposed between the adjacent rollers 65 so as to be in proximate to a surface reverse to a surface 27a (see FIG. 4) of the support 27. The temperature of the temperature controlling plate is adjusted such that the temperature of the surface 27a of the support 27 falls within a predetermined range.

A solvent recovery device (not shown) is disposed in each of the sections 31 to 33 of the coating chamber 22 so as to recover the solvent contained in the atmosphere in each of the sections 31 to 33. The recovered solvent is refined in a refining device (not shown) to be reused for preparation of the solution 28 or for other purposes.

Next, referring to FIGS. 2 and 3, the porous film production method is described. In the porous film production method, a solution preparing step 81, a primary body forming step 82, a water drop generating step 83, and a water drop evaporating step 84 are sequentially performed. Additionally, a fluidity decreasing step 85 is performed in parallel with the water drop generating step 83. Each of the steps is described in detail hereinbelow.

(Solution Preparing Step)

In the solution preparing step 81, the solution 28 is prepared using the hydrophobic polymer, and the good solvent component and the poor solvent component for the hydrophobic polymer. The prepared solution 28 is stored in the tank.

In the porous film production apparatus 20, the rollers 65 are driven to rotate, and the support 27 is fed from the support feeding device 21 to the coating chamber 22. The temperature of the surface 27a of the support 27 is kept approximately constant within a predetermined range (within the range of 0° C. to 30° C.) by the not-shown temperature controlling plate. The support 27 passes through the first section 31, the second section 32, and the third section 33 in this order at a predetermined speed (at a speed of 0.001 m/min to 50 m/min). The pump 44 is used to supply a prescribed amount of the solution 28 adjusted at an approximately constant temperature within a predetermined range (within the range of 0° C. to 30° C.) from the tank to the coating die 35.

(Primary Body Forming Step)

The primary body forming step 82 is performed in the first section 31. In the primary body forming step 82, the solution 28 is applied to the surface 27a of the support 27 from the coating die 35 such that the coating film 29 having a thickness TH0 is formed on the surface 27a (see FIG. 4A). The coating film 29 is a primary body having film form. The thickness TH0 can be controlled by adjusting the viscosity and flow volume of the solution 28, the clearance of the slot, the moving speed of the support 27, and the like. The thickness TH0 of the coating film 29 immediately after being formed is preferably at most 1500 μm, more preferably at most 1000 μm, and most preferably at most 500 μm. Note that, in order to form the coating film 29 having a uniform thickness, it is preferable that the thickness TH0 is at least 10 μm.

(Water Drop Generating Step and Fluidity Decreasing Step)

The wet air 400 adjusted at a predetermined condition is blown from the air feeding/sucking units 36 toward the coating film 29. The wet air 400 contacts with the coating film 29 such that the water drop generating step 83 and the fluidity decreasing step 85 are performed in parallel with each other. In order to perform the water drop generating step 83 and the fluidity decreasing step 85 in parallel with each other, for example, the upstream one of the two air feeding/sucking units 36 in the X direction is used to perform only the water drop generating step 83, and the downstream one of the two air feeding/sucking units 36 in the X direction is used to perform both of the water drop generating step 83 and the fluidity decreasing step 85.

In the second section 32, the coating film 29 contains a large amount of solvent 403, and the solution 28 for forming the coating film 29 has fluidity enough to generate water drops 402 upon condensation and enough to allow movement of the generated water drops 402. The generated water drops 402 move in the thickness direction of the coating film 29 or in a direction intersecting with the thickness direction. Accordingly, the water drops 402 are generated on the coating film 29 in the water drop generating step 83. Then, the generated water drops 402 enter the inside of the coating film 29, or move along the surface of the coating film 29. As a result, the water drops 402 are arranged in a honeycomb manner on the coating film 29 (see FIG. 4B).

Figure 4B:
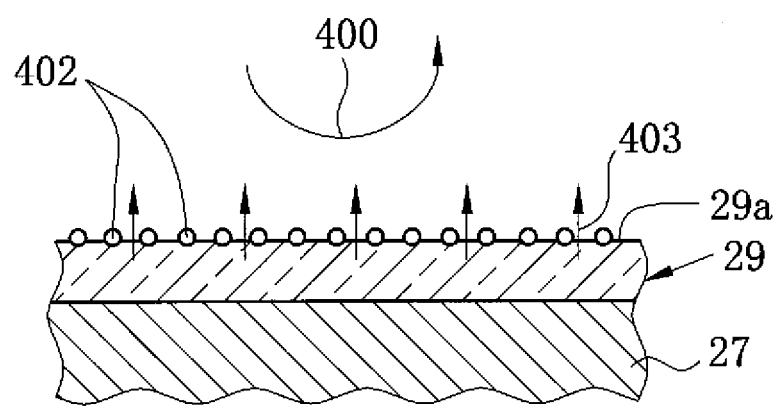

Further, in the fluidity decreasing step 85, the solvent 403 is evaporated from the coating film 29 (see FIG. 4B). Due to the evaporation of the solvent 403 from the coating film 29, the fluidity of the solution 28 for forming the coating film 29 is decreased, and therefore generation of new water drops 402 upon condensation and movement of the water drops 402 are suppressed. The fluidity decreasing step 85 is performed until new water drops 402 are no longer generated upon condensation and the water drops 402 no longer move. According to the present invention, the solvent 403 contains the good solvent component and poor solvent component for the hydrophobic polymer. Therefore, as the good solvent component is evaporated from the coating film 29 in the fluidity decreasing step 85, decrease in the fluidity of the solution 28 containing the poor solvent component proceeds more promptly. In view of the above, according to the present invention, it becomes possible to decrease the time required for the water drop generating step 83 in comparison with the conventional methods. Therefore, it is possible to produce the porous film in shorter period of time in comparison with the conventional methods.

At the start of the water drop generating step 83, a remaining amount of solvent in the solution 28 for forming the coating film 29 is preferably at least 400 mass %. The remaining amount of solvent is calculated by a formula expressed by $[(x-y)/y] \times 100$, in which x is the weight of a sampling film at the time of sampling, and y is the weight of the same after being dried completely. The sampling film is taken from a target coating film. Note that, the remaining amount of solvent in the solution also can be calculated by the thickness of the sampling film instead of the weight of the sampling film. The thickness of the sampling film can be measured by a non-contact film thickness measuring device such as a laser displacement meter. Further, at the start of the water drop generating step 83, the viscosity of the solution 28 for forming the coating film 29 is preferably at most 100 Pa·s, more preferably at most 10 Pa·s, and most preferably at most 1 Pa·s.

(Water Drop Evaporating Step)

The water drop evaporating step 84 is performed in the third section 33. In the water drop evaporating step 84, the dry air 404 adjusted at a predetermined condition is blown from the air feeding/sucking units 38 toward the coating film 29. Upon contact of the dry air 404 with the coating film 29, the water drops 402 are evaporated from the coating film 29. Accordingly, the coating film 29 subjected to the water drop evaporating step 84 becomes the porous film 10.

Further, according to the present invention, the fluidity decreasing step 85 is performed in parallel with the water drop generating step 83, and therefore, the timing for completing the water drop generating step 83 can be controlled by adjusting conditions in the fluidity decreasing step 85. In a case where the fluidity of the solution required for the water drop generating step 83 is lower than that required for the primary body forming step 82, the fluidity decreasing step 85 is performed in parallel with the water drop generating step 83, and thereby it becomes possible to complete the water drop evaporating step 84 earlier than the conventional methods in which the solvent is evaporated from the coating film after the water drops each having a desired size are formed. As described above, according to the present invention, it is possible to produce the porous film in a short period of time.

Note that, the water drop generating step 83 and the water drop evaporating step 84 may be sequentially performed. Further, the primary body forming step 82 and the water drop generating step 83 may be sequentially performed.

Figure 5:
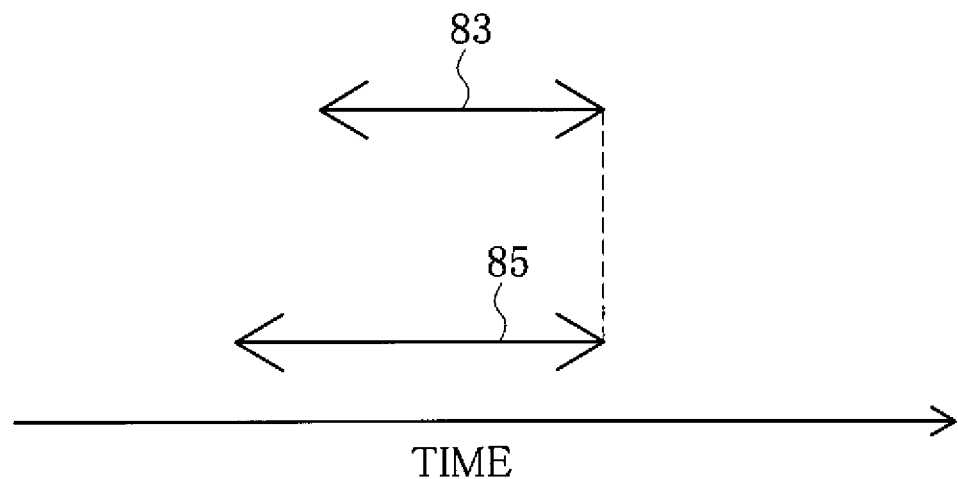
FIG. 5 is an explanatory view schematically illustrating a porous film production method of a second embodiment.
Figure 6:
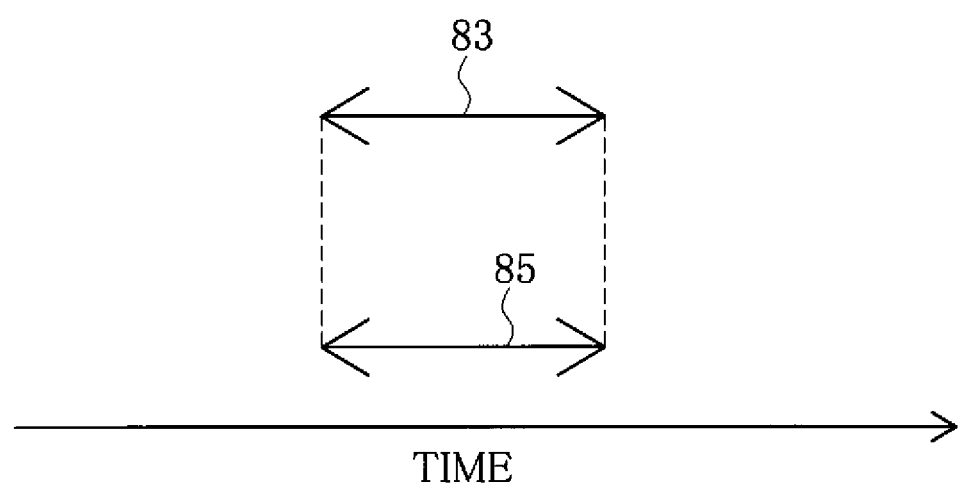
FIG. 6 is an explanatory view schematically illustrating a porous film production method of a third embodiment.

Although the fluidity decreasing step 85 is started in the middle of the water drop generating step 83 in the above embodiment, the present invention is not limited thereto. As shown in FIG. 5, the fluidity decreasing step 85 may be started before the start of the water drop generating step 83. In order to start the fluidity decreasing step 85 before the start of the water drop generating step 83, for example, in the porous film production apparatus 20 shown in FIG. 2, the upstream one of the two air feeding/sucking units 36 in the X direction is used to perform only the fluidity decreasing step 85, and the downstream one of the two air feeding/sucking units 36 in the X direction is used to perform both of the water drop generating step 83 and the fluidity decreasing step 85. Alternatively, as shown in FIG. 6, the fluidity decreasing step 85 and the water drop generating step 83 may be started at the same time. In order to start the fluidity decreasing step 85 and the water drop generating step 83 at the same time, for example, in the porous film production apparatus 20 shown in FIG. 2, each of the air feeding/sucking units 36 is used to perform both of the water drop generating step 83 and the fluidity decreasing step 85.

Note that, it is preferable that, at the time of completing the fluidity decreasing step 85, the fluidity of the solution 28 for forming the coating film 29 has been disappeared. However, the solution 28 for forming the coating film 29 may have some degree of fluidity as long as generation or growth of water drops can be suppressed. Namely, at the time of completing the fluidity decreasing step 85, the solvent may have been evaporated completely from the solution 28 for forming the coating film 29 or some amount of solvent may remain in the solution 28 for forming the coating film 29. In a case where some amount of solvent remains in the solution 28 for forming the coating film 29 at the time of completing the fluidity decreasing step 85, the timing for evaporating the solvent 403 remained in the coating film 29 may be before or after the evaporation of the water drops 402, or at the same time as the evaporation of the water drops 402.

Although the water drops 402 are generated on the surface 29a of the coating film 29 in the water drop generating step 83 in the above embodiment, the present invention is not limited thereto. The water drops 402 may be grown up in the water drop generating step 83. In this case, in the fluidity decreasing step 85, not only the generation and movement of the water drops 402 but also growth of the water drops 402 can be suppressed.

(Conditions for Wet Air)

The formation amount of cores of the water drops 402 or the growth degree of cores of the water drops 402 can be controlled by adjusting a parameter $\Delta Tw$ obtained by subtracting the temperature TS of the surface 29a of the coating film 29 from the dew point TD of the wet air 400. The temperature TS can be adjusted by the temperature of the surface 27a of the support 27 and the temperature of the solution 28. In order to condense water vapor from ambient air, the parameter $\Delta Tw$ in the second section 32 is preferably at least 0° C. Further, the parameter $\Delta Tw$ is preferably in the range between 0.5° C. or more and 30° C. or less, more preferably in the range between 1° C. or more and 25° C. or less, and most preferably in the range between 1° C. or more and 20° C. or less.

In order to evaporate the solvent from the coating film 29 upon contact of the wet air 400 with the coating film 29, it is possible to adjust a parameter $\Delta Ts$ obtained by subtracting an atmospheric temperature TA around the coating film 29 from a condensation point TR of the solvent vapor contained in the wet air 400 within a predetermined range. The timing for completing the fluidity decreasing step 85 can be controlled by adjusting the parameter $\Delta Ts$, and as a result, the timing for completing the water drop generating step 83 can be controlled. Note that, the atmospheric temperature TA can be adjusted by the temperature of the wet air 400 and the atmospheric temperature in the second section 32. The condensation point TR of the solvent vapor contained in the wet air 400 can be adjusted by not only the air feeding/sucking units 36 but also the solvent recovery device (not shown). For example, $\Delta Ts$ is preferably less than 0° C. Note that, in the calculation of the parameter $\Delta Ts$, the atmospheric temperature TA can be substituted with the temperature of the wet air 400 or the temperature TS of the surface 29a.

In the fluidity decreasing step 85, it is sufficient to evaporate the good solvent component from the coating film 29, and it is also sufficient to evaporate both the good solvent component and the poor solvent component from the coating film 29. In order to evaporate the good solvent component from the coating film 29, it is sufficient to adjust a parameter $\Delta Tsr$ obtained by subtracting the atmospheric temperature TA around the coating film 29 from a condensation point TRr of vapor of the good solvent component contained in the wet air 400 within a predetermined range. For example, it is sufficient to set the parameter $\Delta Tsr$ to be less than 0° C. In contrast, in order to evaporate the poor solvent component from the coating film 29, a parameter $\Delta Tsh$ obtained by subtracting the atmospheric temperature TA around the coating film 29 from a condensation point TRh of vapor of the poor solvent component contained in the wet air 400 within a predetermined range. For example, it is sufficient to set the parameter $\Delta Tsh$ to be less than 0° C. Additionally, it is preferred to evaporate the good solvent component in preference to the poor solvent component such that decrease in the fluidity of the solution is accelerated. In order to evaporate the good solvent component in preference to the poor solvent component, for example, it is possible to set the parameter $\Delta Tsr$ to be smaller than parameter $\Delta Tsh$. Here, evaporating the good solvent component in preference to the poor solvent component means making the evaporation speed of the good solvent component faster than the evaporation speed of the poor solvent component.

Further, it is preferred to perform the evaporation of the good solvent component prior to the evaporation of the poor solvent component such that decrease in the fluidity of the solution is accelerated. In order to perform the evaporation of the good solvent component prior to the evaporation of the poor solvent component, for example, it is possible to evaporate the good solvent component using the upstream one of the two air feeding/sucking units 36 in the X direction, and evaporate the poor solvent component using the downstream one of the two air feeding/sucking units 36 in the X direction. Here, performing the evaporation of the good solvent component prior to the evaporation of the poor solvent component means that the timing for completing the evaporation of the good solvent component is made earlier than the timing for completing the evaporation of the poor solvent component.

The timing for completing the evaporation of the poor solvent component need not be the timing at which the poor solvent component has been evaporated completely. Namely, when the fluidity of the solution 28 for forming the coating film 29 is decreased to achieve the level at which generation or growth of water drops can be suppressed, it is possible to consider that the evaporation of the poor solvent component has been completed.

Further, the timing for completing the evaporation of the good solvent component need not be the timing at which the good solvent component has been evaporated completely. Namely, when the amount of the good solvent component is decreased to achieve a level at which the decrease in the fluidity 28 for forming the coating film 29 due to the evaporation of the poor solvent component after the evaporation of the good solvent component can be enhanced, it is possible to consider that the evaporation of the good solvent component has been completed. Accordingly, after the timing for completing the evaporation of the good solvent component, the evaporation of the poor solvent component may be accompanied by the evaporation of the good solvent component.

As described above, the parameters $\Delta Tw$ and $\Delta Ts$ are appropriately adjusted, and thereby it is possible to subject the coating film 29 to one of the water drop generating step 83 and the fluidity decreasing step 85, or subject the coating film 29 to the water drop generating step 83 and the fluidity decreasing step 85 at the same time.

The control by adjusting the parameters $\Delta Tw$ and $\Delta Ts$ has a merit in that the adjustment of the diameter D1 of each of the pores 11 (see FIG. 1) can be easier, and the regularity in the arrangement of the pores 11 can be increased, in comparison with the control by adjusting only the parameter $\Delta Tw$ in a conventional manner.

Although the wet air is used in the above embodiment, the present invention is not limited thereto. Wet gas may be used. Similarly, dry gas may be used instead of the dry air. Nitrogen, rare gas, and the like may be used as the gas.

Although the porous film 10 is cut together with the support 27 into a predetermined size in the cutting device 23 as shown in FIG. 2 in the above embodiment, the present invention is not limited thereto. For example, in a case where the support 27 moves continuously to pass sequentially the first section 31 to the third section 33 like an endless belt or drum made by stainless, and other polymer films, the porous film 10 may be peeled from the support 27 and then introduced to the cutting device 23. Further, in the case of low volume production, instead of the support 27 in the form of belt, a support in the form of sheet may be used.

(Solution)

Figure 4C:
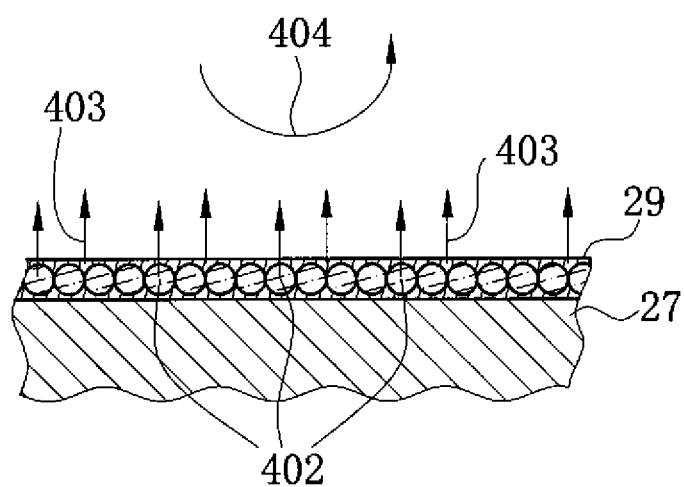

In FIGS. 3 and 4, a mass concentration of the hydrophobic polymer contained in the solution 28 is sufficient as long as it is possible to form the coating film 29 having a uniform thickness on the surface 27a of the support 27 in the primary body forming step 82. For example, the mass concentration of the hydrophobic polymer contained in the solution 28 is preferably in the range between 0.01 mass % or more and 30 mass % or less. The hydrophobic polymer having the mass concentration of less than 0.01 mass % may be unsuitable for industrial mass production, because the productivity of the films becomes low in some cases. In contrast, the hydrophobic polymer having the mass concentration of more than 30 mass % is not preferable, because the viscosity of the solution 28 makes it difficult to form the coating film 29. Additionally, the mass concentration of the hydrophobic polymer is preferably at most 5 mass %, more preferably in the range between 0.01 mass % or more and 5 mass % or less, particularly preferably in the range between 0.05 mass % or more and 3 mass % or less, and most preferably in the range between 0.1 mass % or more and 2 mass % or less.

Interfacial tension between the solution 28 and water is preferably in the range of 5 mN/m or more and 20 mN/m or less. When the interfacial tension between the solution 28 and water is more than 20 mN/m, it becomes difficult to generate minute water drops on a liquid surface of the solution 28, unfavorably. In contrast, when the interfacial tension between the solution 28 and water is less than 5 mN/m, it becomes difficult to increase the diameter of each of the water drops, unfavorably.

(Good Solvent Component)

The good solvent component is not especially limited as long as it can dissolve the hydrophobic polymer, and may be an organic solvent, for example. As the good solvent component, for example, there are halogenated organic solvent such as dichloromethane, trichloromethane, carbon tetrachloride, and the like, aromatic hydrocarbon such as benzene, toluene, xylene, and the like, esters such as methyl acetate, ethyl acetate, butyl acetate, and the like, water-insoluble ketones such as methyl isobutyl ketone, and carbon bisulfide. The good solvent component may be a single compound, or a mixture of two or more compounds.

(Poor Solvent Component)

The preferable poor solvent component does not dissolve the hydrophobic polymer and has compatibility with the good solvent component. As the poor solvent component, for example, there are hydrophilic solvents such as alcohol, ketone, and ether, and hydrophobic solvents such as fluorinated solvents and saturated hydrocarbon (alkane). The fluorinated solvent is hydrofluoroethers or the like. The saturated hydrocarbon (alkane) is in a liquid state at a normal temperature, and includes pentane, n-hexane, cyclohexane, heptane, and octane. From the view point of stability of the water drops, the hydrophobic solvent is preferably used as the poor solvent component. The poor solvent component may be a single compound, or a mixture of two or more compounds.

In a case where it is desired to judge whether a certain substance is the poor solvent component or good solvent component for the polymer, it is sufficient to mix the substance and the polymer such that the polymer is equivalent to 5 mass % of the total amount of the mixture of the substance and the polymer at a temperature within the range of 5° C. to 30° C. If there is undissolved material in the mixture, the substance is judged as the poor solvent component, and if there is no undissolved material in the mixture, the substance is judged as the good solvent component.

A mass concentration of the good solvent component is denoted by Mr, and a mass concentration of the poor solvent component is denoted by Mh. The value of Mh/Mr is preferably in the range between 0.01 or more and 2 or less, and more preferably in the range between 0.05 or more and 1 or less.

A boiling point BPr of the good solvent component may be smaller than, larger than, or equal to a boiling point Bph of the poor solvent component. In order to complete the fluidity decreasing step 85 before the start of the water drop evaporating step 84, the boiling points BPr and Bph are preferably smaller than the boiling point of water.

Although the poor solvent component may have either hydrophobic character or hydrophilic character, it is particularly preferable that the poor solvent component has the hydrophobic character. In a case where the poor solvent component having the hydrophobic character is used, the water drops tend to be stable in a spherical form and variation in size of the water drops can be prevented, in comparison with the case where the poor solvent component having the hydrophilic character is used. As a result, the poor solvent component having the hydrophobic character has a merit in that the diameter D1 of each of the pores 11 (see FIG. 1) becomes uniform.

(Polymer)

The hydrophobic polymer is preferably used as a material of the porous film. Moreover, although only the hydrophobic polymer is sufficient to form the porous film, it is preferable that an amphiphilic polymer is used together with hydrophobic polymer, from the view point of stability of the water drops formed on the coating film 29.

(Hydrophobic Polymer)

The hydrophobic polymer is not especially limited, and may be appropriately selected among publicly known hydrophobic polymers in accordance with the purpose. Examples of the hydrophobic polymers are vinyl-type polymer (for example, polyethylene, polypropylene, polystyrene, polyacrylate, polymethacrylate, polyacrylamide, polymethacrylamide, polyvinyl chloride, polyvinylidene chloride, polyvinylidene fluoride, polyhexafluoropropene, polyvinyl ether, polyvinyl carbazol, polyvinyl acetate, polytetrafluoroethylene, and the like), polyesters (for example, polyethylene terephthalate, polyethylene naphthalate, polyethylene succinate, polybutylene succinate, polylactic acid, and the like), polylactone (for example, polycaprolactone and the like), polyamide or polyimide (for example, nylon, polyamic acid, and the like), polyurethane, polyurea, polybutadiene, polycarbonate, polyaromatics, polysulfone, polyethersulfone, polysiloxane derivative, cellulose acylate (for example, triacetyl cellulose, cellulose acetate propionate, cellulose acetate butyrate, and the like), and the like. These may be used in the form of homo polymer, and otherwise used as copolymer or polymer blend as necessary, in view of solubility, optical physical properties, electric physical properties, film strength, elasticity, and the like. Note that, these polymers may be used in the form of mixture containing two or more kinds of polymers as necessary. The polymers for optical purpose are preferably cellulose acylate, cyclic polyolefin, and the like, for example.

(Amphiphilic Polymer)

The amphiphilic polymer is not especially limited, and appropriately selected in accordance with the purpose. For example, there are an amphiphilic polymer which has a main chain of polyacrylamide, a hydrophobic side chain of dodecyl group, and a hydrophilic side chain of carboxyl group, a block copolymer of polyethylene glycol/polypropylene glycol, and the like.

The hydrophobic side chain is a group which has nonpolar normal (linear) chain such as alkylene group, phenylene group, and the like, and preferably has a structure in which a hydrophilic group such as polar group or ionic dissociative group is not divided until the end of the chain, except a linking group such as ester group and amide group. The hydrophobic side chain preferably has at least five methylene units if it is composed of alkylene group. The hydrophilic side chain preferably has a structure having a hydrophilic part such as polar group, ionic dissociative group, or oxyethylene group on the end through a linking part such as alkylene group.

The ratio of the hydrophobic side chain to the hydrophilic side chain varies depending on the size of the side chain, the intensity of polarity, the strength of hydrophobicity of the hydrophobic organic solvent, or the like, and cannot be specified in general. However, the unit ratio (hydrophilic group: hydrophobic group) is preferably in the range of 0.1:9.9 to 4.5:5.5. Further, in the case of the copolymer, a block copolymer in which blocks of the hydrophobic side chain and blocks of the hydrophilic side chain do not affect the solubility thereof in the hydrophobic solvent is preferably used, rather than an alternating polymer of a hydrophobic side chain and a hydrophilic side chain.

The number average molecular weight (Mn) of the hydrophobic polymer and the amphiphilic polymer is preferably in the range of 1,000 to 10,000,000, and more preferably in the range of 5,000 to 1,000,000.

The composition ratio (mass ratio) of the hydrophobic polymer to the amphiphilic polymer is preferably in the range of 99:1 to 50:50, and more preferably in the range of 98:2 to 70:30. In a case where the ratio of the amphiphilic polymer is less than 1 mass %, it is impossible in some cases to obtain a porous film in which the pores uniform in size are formed at uniform pitch. In contrast, in a case where the ratio of the amphiphilic polymer is more than 50 mass %, stability of the coating film, in particular, mechanical stability thereof cannot be obtained sufficiently in some cases.

It is also preferable that the hydrophobic polymer and the amphiphilic polymer to be used as the material of the porous film are a polymerizable (crosslinkable) polymer having a polymerizable group in its molecule. Further, preferably, a polymerizable polyfunctional monomer is blended together with the hydrophobic polymer and/or the amphiphilic polymer, and after forming a honeycomb film by the blending, the honeycomb film is cured by a publicly known method such as a thermal curing method, a UV curing method, or an electron beam curing method.

As the polyfunctional monomer that can be used together with the hydrophobic polymer and/or the amphiphilic polymer, polyfunctional (meth)acrylate is preferable from the viewpoint of reactivity. As the polyfunctional (meth)acrylate, for example, there can be used dipentaerythritol pentaacrylate, dipentaerythritol hexaacrylate, dipentaerythritol caprolactone adduct hexaacrylate or modified compound thereof, epoxy acrylate oligomer, polyester acrylate oligomer, urethane acrylate oligomer, N-vinyl-2-pyrrolidone, tripropylene glycol diacrylate, polyethylene glycol diacrylate, trimethylolpropane triacrylate, pentaerythritol triacrylate, pentaerythritol tetraacrylate or modified compound thereof, and the like. These polyfunctional monomers are used alone or in combination of two or more types thereof from the viewpoint of the balance between resistance to abrasion and flexibility.

In a case where the hydrophobic polymer and the amphiphilic polymer are a polymerizable (crosslinkable) polymer having a polymerizable group in its molecule, it is also preferred to use a polymerizable polyfunctional monomer that can react with the polymerizable group of the hydrophobic polymer and the amphiphilic polymer.

The monomer having an ethylene type unsaturated group can be polymerized by irradiation of ionizing radiation or heating under the presence of a photoradical initiator or a thermal radical initiator. Accordingly, a coating liquid containing the monomer having the ethylene type unsaturated group, the photoradical initiator or the thermal radical initiator, matting particles, and inorganic filler is prepared, and then the coating liquid is applied to a transparent support and cured by polymerization reaction caused by irradiation of ionizing radiation or heating. Thereby, a porous film capable of being used as an antireflection film can be produced.

As the photoradical initiator, there are acetophenones, benzoins, benzophenones, phosphine oxides, ketals, anthraquinones, thioxanthones, azo compounds, peroxides, 2,3-alkyl dion compounds, disulfide compounds, fluoroamine compounds, and aromatic sulfoniums, for example.

As the acetophenones, there are 2,2-ethoxyacetophenone, p-methylacetophenone, 1-hydroxydimethyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, and the like, for example.

As the benzoins, there are benzoin benzenesulfonic ester, benzoin toluenesulfonic ester, benzoin methyl ether, benzoin ethyl ether, benzoin isopropyl ether, and the like, for example.

As the benzophenones, there are benzophenone, 2,4-chlorobenzophenone, 4,4-dichlorobenzophenone, p-chlorobenzophenone, and the like, for example.

As the phosphine oxides, there are 2,4,6-trimethylbenzoyl diphenylphosphine oxide and the like, for example.

Various examples of the photoradical initiator are described in "Saishin UV-Koka Gijutsu (Latest UV Curing Technologies)" (page 159, publisher: Kazuhiro TAKABO, publishing company: Technical Information Institute CO., LTD, 1991). As a preferable example of a commercially available photocleavage-type photoradical initiator, there is Irgacure (651,184,907) produced by Chiba Specialty Chemicals CO., Ltd (Ciba Japan K.K.).

The photoradical initiator is preferably used within the range of 0.1 to 15 parts by mass, and more preferably within the range of 1 to 10 parts by mass, relative to 100 parts by mass of the polyfunctional monomer.

Note that, a photosensitizer may be used in addition to the photoradical initiator. As the example of the photosensitizer, there are n-butylamine, triethylamine, tri-n-butylphosphine, Michler's ketone, thioxanthone, and the like.

As the thermal radical initiator, organic peroxide, inorganic peroxide, organic azo compound, organic diazo compound, and the like can be used, for example.

As the organic peroxide, there are benzoyl peroxide, halogen benzoyl peroxide, lauroyl peroxide, acetyl peroxide, dibutyl peroxide, cumene hydroperoxide, butyl hydroperoxide, and the like, for example. As the inorganic peroxide, there are hydrogen peroxide, ammonium persulfate, potassium persulfate, and the like, for example. As the azo compound, there are 2,2'-azobis(isobutyronitrile), 2,2'-azobis(propionitrile), 1,1'-azobis(cyclohexanecarbonitrile), and the like, for example. As the diazo compound, there are diazoaminobenzene, p-nitrobenzenediazonium, and the like, for example.

EXAMPLE

Examples of the present invention are described hereinbelow. Experiment 1 is described in detail. As to Experiments 2 to 6 and Comparative Experiment 1, the descriptions of conditions identical to those of Experiment 1 are omitted.

Experiment 1

In Experiment 1, the solution 28 having the following composition was prepared. Then, the solution 28 was filtered to remove foreign substances therefrom.

| | |
|---|---|
| Hydrophobic polymer (Polystyrene) | 1.0 mass % |
| Amphiphilic polymer (Polyacrylamide) | 0.1 mass % |
| Good solvent component A (Trichloromethane) | 68.9 mass % |
| Poor solvent component B (N-hexane) | 30.0 mass % |

As shown in FIG. 2, the solution 28 kept at an approximately constant temperature within the range of 10° C. to 30° C. was discharged from the coating die 35 onto the support 27 to form the coating film 29 on the surface 27a of the support 27 in the primary body forming step 82. The thickness TH0 of the coating film 29 (see FIG. 4) was 500 µm.

The air feeder 53 adjusted the wet air 400 such that the parameter ΔTs was approximately constant in the range of −30° C. to −20° C. and the parameter ΔTw was approximately constant in the range of 5.0° C. to 6.0° C. The wet air 400 was blown from the air feeding/sucking units 36 toward the coating film 29 such that the water drop generating step 83 and the fluidity decreasing step 85 were performed at the same time. The blowing speed of the wet air 400 from the air feeding/sucking units 36 was 0.5 m/sec.

The air feeder 63 adjusted the dry air 404 such that the parameter ΔTs was approximately constant in the range of −30° C. to −20° C. and the parameter ΔTw was approximately constant in the range of −6.0° C. to −5.0° C. The dry air 404 was blown from the air feeding/sucking units 38 toward the coating film 29 in the water drop evaporating step 84. The blowing speed of the dry air 404 from the air feeding/sucking units 38 was 5.0 m/sec.

The time required for performing both of the water drop generating step 83 and the fluidity decreasing step 85 is denoted by T1 (see FIG. 3), and the time required for performing the water drop evaporating step 84 is denoted by T2 (see FIG. 3), and the sum of T1 and T2 is denoted by Tx. Tx was measured.

The thickness TH1 of the obtained porous film 10 was approximately 3.0 µm, the diameter D1 of each of the pores 11 was approximately 5.0 µm, and the pitch P1 that is a distance between centers of the adjacent pores 11 was approximately 6.0 µm.

Experiments 2 to 6 and Comparative Experiment 1

In Experiments 2 to 6, the porous film 10 was produced in the same manner as Experiment 1 except the conditions shown in Table 1. Similarly, in Comparative Experiment 1, a porous film was produced in the same manner as Experiment 1 except the conditions shown in Table 1. Table 1 shows the name of compound of the hydrophobic polymer, the name of compound of the good solvent component A, the concentration Mr of the good solvent component A, the name of compound of the poor solvent component B, the concentration Mh of the poor solvent component B, and the value of Mh/Mr. The concentration Mr denotes the mass concentration of the good solvent component in the solution. The concentration Mh denotes the mass concentration of the poor solvent component in the solution. In Experiment 6, the fluorinated solvent used as the poor solvent component B was "ASAHIK- LIN AK-225" manufactured by ASASHI GLASS CO., LTD. Further, in Table 1, EX denotes experiment, COM denotes comparative experiment, PS denotes polystyrene, PLLA denotes polylactic acid, TCM denotes trichloromethane, and DCM denotes dichloromethane.

TABLE 1

|  |  | EX 1 | EX 2 | EX 3 | EX 4 |
|---|---|---|---|---|---|
| Hydrophobic polymer |  | PS | PS | PS | PS |
| Good solvent component A | Compound name | TCM | TCM | DCM | TCM |
|  | Mr (mass %) | 68.9 | 95 | 88.9 | 30 |
| Poor solvent component B | Compound name | n-hexane | n-hexane | ethanol | n-hexane |
|  | Mh (mass %) | 30 | 3.9 | 10 | 68.9 |
| Mh/Mr |  | 0.44 | 0.04 | 0.11 | 2.30 |
| Evaluation result | 1 | A | C | B | A |
|  | 2 | A | A | C | C |

|  |  | EX 5 | EX 6 | COM 1 |
|---|---|---|---|---|
| Hydrophobic polymer |  | PLLA | PLLA | PS |
| Good solvent component A | Compound name | TCM | TCM | TCM |
|  | Mr (mass %) | 78.9 | 78.9 | 98.9 |
| Poor solvent component B | Compound name | n-hexane | Fluorinated solvent | None |
|  | Mh (mass %) | 20 | 20 | 0 |
| Mh/Mr |  | 0.25 | 0.25 | 0.00 |
| Evaluation result | 1 | A | A | D |
|  | 2 | A | A | A |

(Evaluation)

The following items were evaluated based on the following criteria in Experiments 1 to 6 and Comparative Experiment 1. The evaluation result of each item is shown in Table 1. The numbers assigned to the evaluation results in Table 1 show the numbers assigned to the following items.

1. Evaluation of Productivity

Evaluation was made for each of Experiments 1 to 6 and Comparative Experiment 1 based on the following criteria.

A: Tx was 5 minutes or less.
B: Tx was in the range between more than 5 minutes and 10 minutes or less.
C: Tx was in the range between more than 10 minutes and 20 minute or less.
D: Tx was more than 20 minutes.

2. Evaluation of Quality

Pores in an area of 120 μm long and 90 μm wide in an optical micrograph of the surface of the porous film 10 obtained in each of Experiments 1 to 6 and the porous film obtained in Comparative Experiment 1 was subjected to image analysis. The magnitude of the optical micrograph was 2500 times. The diameter of each of the pores was measured, and an average $D_{av}$ of pore diameters, a standard deviation $\sigma D$ of pore diameters, and a pore diameter variation coefficient X (unit: %) were calculated. The pore diameter variation coefficient X was determined as $\{(\sigma D)/(D_{av})\} \times 100$. The pore diameter variation coefficient X was evaluated based on the following criteria. The evaluation result of the pore diameter variation coefficient X is shown in Table 1.

A: Pore diameter variation coefficient X was 5% or less.
B: Pore diameter variation coefficient X was in the range between more than 5% and 10% or less.
C: Pore diameter variation coefficient X was in the range between more than 10% and 15% or less.
D: Pore diameter variation coefficient X was more than 15%.

It was found from the results of Experiments 1 to 6 and Comparative Experiment 1 that it is possible to efficiently produce the porous film according to the present invention.

Various changes and modifications are possible in the present invention and may be understood to be within the present invention.

What is claimed is:

1. A production method of porous film having a plurality of pores comprising the steps of:
   (A) forming a primary body having film form from a solution containing a hydrophobic polymer and a solvent on a support, said solvent including a good solvent component for said hydrophobic polymer and a poor solvent component for said hydrophobic polymer, said poor solvent component having a hydrophobic characteristic;
   (B) condensing water vapor from ambient air on said primary body to generate water drops on said primary body;
   (C) evaporating said solvent from said primary body such that fluidity of said solution for forming said primary body is decreased, the evaporation of said solvent being performed in parallel with the step B, and said good solvent component being evaporated in the evaporation of said solvent; and
   (D) evaporating said water drops from said primary body subjected to the step C, said pores being made by said water drops as a template for a porous structure,
   wherein an evaporation speed of said good solvent component is made faster than an evaporation speed of said poor solvent component.

2. The production method as defined in claim 1, wherein a value of ΔTsr obtained by subtracting TA from TRr is made smaller than a value of ΔTsh obtained by subtracting TA from TRh in the step C, in which said TRr is a condensation point of vapor of said good solvent component, said TA is an atmospheric temperature around said primary body, and said TRh is a condensation point of vapor of said poor solvent component.

3. The production method as defined in claim 1, wherein timing for completing the evaporation of said good solvent component is made earlier than timing for completing the evaporation of said poor solvent component.

4. The production method as defined in claim 1, wherein when a mass concentration of said good solvent component is denoted by Mr and a mass concentration of said poor solvent component is denoted by Mh, the value of Mh/Mr is in the range from 0.01 to 2.

* * * * *